US008890474B2

(12) United States Patent
Kim et al.

(10) Patent No.: US 8,890,474 B2
(45) Date of Patent: Nov. 18, 2014

(54) UNIVERSAL CHARGING DEVICE

(75) Inventors: Young-Choon Kim, Changwon-si (KR); Seong-Doo Kim, Gimhae-si (KR)

(73) Assignees: Hanwha Techm Co., Ltd., Changwon-Si (KR); Moderntec Co., Ltd, Changwon-Si (KR)

( * ) Notice: Subject to any disclaimer, the term of this patent is extended or adjusted under 35 U.S.C. 154(b) by 0 days.

(21) Appl. No.: 13/125,039

(22) PCT Filed: Apr. 14, 2011

(86) PCT No.: PCT/KR2011/002687
§ 371 (c)(1),
(2), (4) Date: Jun. 27, 2011

(87) PCT Pub. No.: WO2011/132887
PCT Pub. Date: Oct. 27, 2011

(65) Prior Publication Data
US 2011/0291616 A1 Dec. 1, 2011

(30) Foreign Application Priority Data
Apr. 20, 2010 (KR) .................. 10-2010-0036317

(51) Int. Cl.
*H02J 7/00* (2006.01)
*B60L 11/18* (2006.01)
*H02J 7/02* (2006.01)
*B60L 3/00* (2006.01)
*B60K 1/00* (2006.01)

(52) U.S. Cl.
CPC ............... *H02J 7/025* (2013.01); *Y02T 90/128* (2013.01); *B60L 11/185* (2013.01); *Y04S 30/14* (2013.01); *B60L 2230/16* (2013.01); *B60L 2210/20* (2013.01); *B60L 2210/30* (2013.01); *Y02T 10/7005* (2013.01); *B60L 3/003* (2013.01); *B60L 2240/36* (2013.01); *Y02T 90/163* (2013.01); *Y02T 90/121* (2013.01); *Y02T 10/7241* (2013.01); *Y02T 90/122* (2013.01); *Y02T 10/7088* (2013.01); *Y02T 90/14* (2013.01); *Y02T 90/169* (2013.01); *Y02T 90/127* (2013.01); *B60L 11/1816* (2013.01); *B60L 11/1848* (2013.01); *Y02T 10/725* (2013.01); *B60L 11/1846* (2013.01)
USPC ........... 320/109; 320/107; 320/117; 180/65.1

(58) Field of Classification Search
CPC ..... Y02T 90/14; Y02T 90/128; Y02T 90/163; B60L 11/185
USPC .......................... 320/107, 109, 117; 180/65.1
See application file for complete search history.

(56) References Cited

U.S. PATENT DOCUMENTS

| 7,667,432 B2* | 2/2010 | West et al. ..................... 320/112 |
| 8,299,754 B2* | 10/2012 | Hayashigawa et al. ....... 320/109 |
| 2004/0130292 A1 | 7/2004 | Buchanan et al. |
| 2010/0013435 A1* | 1/2010 | Tu ................................. 320/109 |
| 2010/0191585 A1* | 7/2010 | Smith ............................. 705/13 |
| 2011/0074350 A1* | 3/2011 | Kocher .......................... 320/109 |
| 2011/0140656 A1* | 6/2011 | Starr et al. .................... 320/109 |

FOREIGN PATENT DOCUMENTS

| JP | 2004-180397 | | 6/2004 |
| JP | 2006-020438 | * | 1/2006 |
| KR | 10-1009485 | | 1/2011 |

OTHER PUBLICATIONS

Machine English Translation of JP 2006-020438, 12 pages.*

* cited by examiner

*Primary Examiner* — Drew A Dunn
*Assistant Examiner* — Nathaniel Pelton
(74) *Attorney, Agent, or Firm* — NSIP Law

(57) ABSTRACT

A universal charging device, the device comprising: a charging pack including at least one of an AC terminal for inputting an AC power, an AC/DC converter for rectifying the AC power to a DC power, a DC terminal for outputting a DC power of a first power value, and a charging pack switch for turning on/off an output of the DC power.

7 Claims, 15 Drawing Sheets

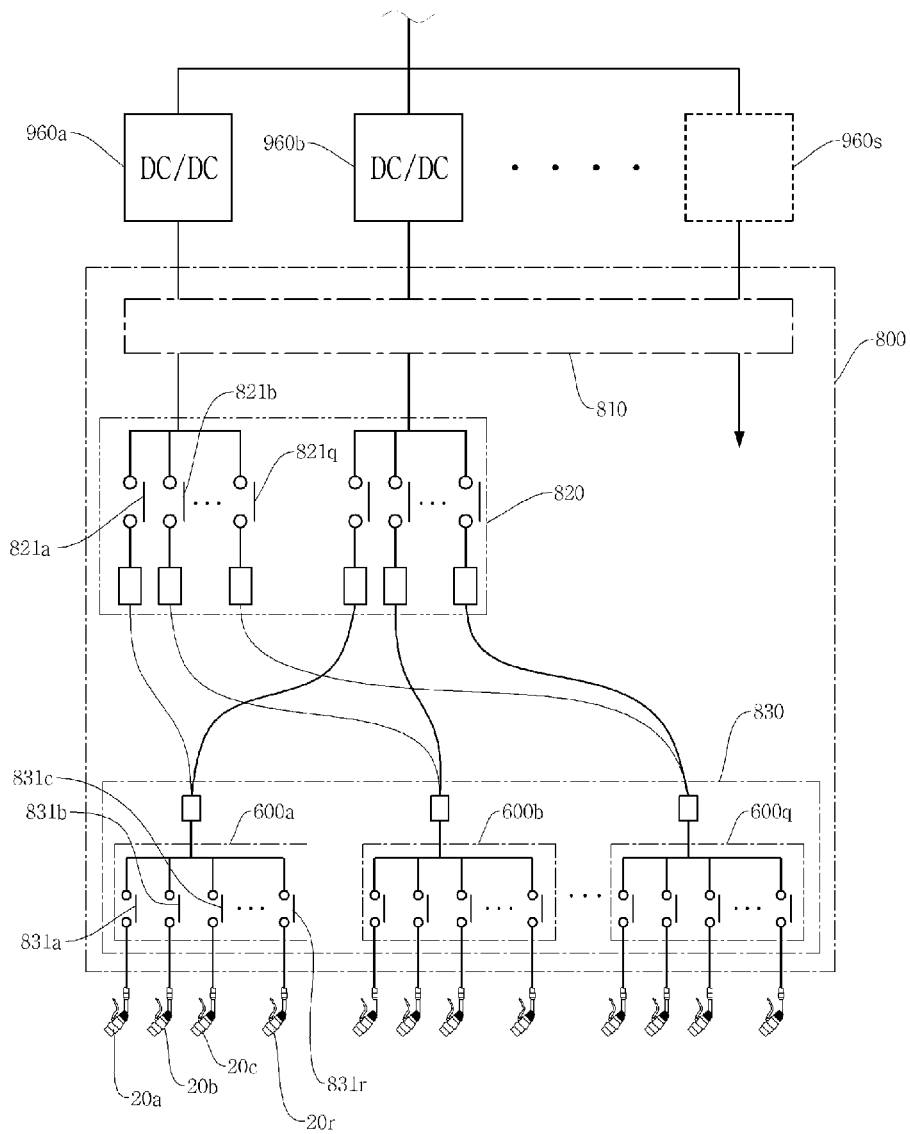

UNIVERSAL CHARGING DEVICE

CROSS-REFERENCE TO RELATED APPLICATIONS

This application is a U.S. national phase application of PCT/KR2011/002687, filed Apr. 14, 2011, designating the United States, claims priority to Korean Application No. 10-2010-0036317, filed Apr. 20, 2010. The entire contents of the aforementioned patent applications are incorporated herein by this reference.

BACKGROUND

The present disclosure relates to a universal charging device configured to charge electric vehicles including an electric car, an electric cart and an electric bicycle.

Electric vehicles must have the capability to be recharged within a short period of time regardless of additional costs for those users who need a quick recharging, in view of the fact that recharging time of electric vehicles are considerably longer than filling time of fossil-fueled vehicles.

Meanwhile, those users interested in recharging costs must be provided an opportunity to be recharged at a low cost through slow recharging. At the same time, heavy-duty electric vehicles such as buses and trucks must also have the capacity to be recharged within an appropriate time.

Thus, a recharging system is needed that is capable of variably outputting a massive DC power and changing a charging power value based on types of vehicles in one-touch system, whereby a charging speed and a charging capacity can be flexibly changed.

Furthermore, development of a charging system is needed which can be installed at a less-spacious area such as a convenience store or a supermarket instead of a spacious filling station, and which can be freed from selection of installation sites.

SUMMARY

The present disclosure is disclosed in view of the foregoing needs, and is to provide a universal charging device for electric vehicles capable of being installed at a low cost, and realizing to implement variation of power value in real time in response to quick and slow charging needs.

The present disclosure is therefore to solve at least one or more of the above problems and/or disadvantages in whole or in part and to provide at least the advantages described hereinafter. In order to achieve at least the above object, in whole or in part, and in accordance with the purpose of the invention, as embodied and broadly described, and in one general aspect of the present disclosure, there is provided a universal charging device, the device comprising: a charging pack including at least one of an AC terminal for inputting an AC power, an AC/DC converter for rectifying the AC power to a DC power, a DC terminal for outputting a DC power of a first power value, and a charging pack switch for turning on/off an output of the DC power, wherein a DC power of various power values in which the first power value increases or decreases can be outputted in response to increase/decrease in installation number of the charging packs and to whether each charging pack switch is turned on or off, and a charging speed of an electric vehicle can be adjusted in response to changes in power value of the DC power.

Preferably, the universal charging device includes a charging module in which a plurality of charging packs are connected in series or in parallel, wherein the charging module includes at least one of an AC input portion for commonly inputting the AC power to the AC terminal, a DC output portion for connecting the DC terminal in series or in parallel, and a charging module controller for data-communicating with the charging packs to individually control the charging packs in response to whether the charging pack switch is turned on or off.

Preferably, the universal charging device includes a charging unit formed with an AC bus bar commonly connected to the AC input portion or a DC bus bar connected in series or in parallel to the DC output portion, wherein a plurality of charging modules is connected in attachably and detachably in series or in parallel manners, and a power value of DC power outputted from the DC bus bar is variable in proportion to the number of charging modules installed at the charging unit.

Preferably, the universal charging device can vary an output voltage or an output current of the DC terminal outputting the first power value, and can apply power values distinguishable from each connector, output voltages distinguishable from each other, and output currents distinguishable from each other, when a plurality of connectors is provided that connects the DC terminal to the electric vehicle.

Preferably, the universal charging device includes a kiosk formed with a connector which is a charging interface, or a display portion for displaying a charged level, wherein the charging pack is separately provided from the kiosk and installed at a position different from that of the kiosk.

In another general aspect of the present disclosure, there is provided a universal charging device, comprising: charging packs generating a DC power of the first power value; charging modules in which the charging packs are arranged in series or in parallel; or a charging unit in which the charging modules are arranged in attachably and detachably in series or in parallel manners.

Preferably, the universal charging device includes a kiosk formed with a connector which is a charging interface, or a display portion for displaying a charged level, and a main controller for distinguishably supplying per connector a DC power of various power values for increasing and/or decreasing the first power value of the charging packs in response to the number of installation or operation status of the charging packs received through data communication, the number of installation or operation status of the charging modules received through data communication, the number of installation or operation status of the charging unit received through data communication, the number of installation or operation status of the kiosk received through data communication.

Preferably, the charging pack includes at least one of an AC terminal into which an AC power is inputted, an AC/DC converter rectifying the AC power to the DC power, a DC terminal outputting the DC power, and a charging pack switch turning on/off the output of the DC power, wherein the charging module includes at least one of an AC input portion for commonly inputting the AC power to the AC terminal, a DC output portion for connecting the DC terminal in series or in parallel, and a charging module controller for data-communicating with the charging packs to individually control the charging packs in response to whether the charging pack switch is turned on or off, and the charging unit includes an AC bus bar commonly connected to the AC input portion or a DC bus bar commonly connecting the DC output portion in series or in parallel, and wherein the AC power is distributed to each charging module through the AC input portion after being inputted to the charging unit through the AC bus bar, and is commonly inputted to each charging pack through the AC terminal, and the DC power outputted as the first power value through the DC terminal is changed in its power value through the DC output portion or the DC bus bar.

In another general aspect of the present disclosure, there is provided a universal charging device, the device comprising: a charging pack generating a DC power of a first power value; a charging module in which a plurality of charging packs is arranged in series or in parallel, wherein the charging pack includes a first charging pack to an nth charging pack, the charging module includes a first charging module to a kth charging module; and a main controller turning on a particular charging pack by selecting the particular charging pack among the first charging pack to the nth charging pack, or turning on a particular charging module by selecting the particular charging module among the first charging module to the kth charging module.

In still another general aspect of the present disclosure, there is provided a universal charging device, the device comprising: a kiosk provided with a plurality of connectors which is a charging interface of an electric vehicle, or a display portion for displaying a charged level; and a charging pack supplying DC power to the kiosk, wherein the charging pack is separately provided from the kiosk, and installed at a position different from that of the kiosk.

Preferably, each connector is distinguishably applied with at least one of a power value of the DC power, an output voltage of AC power and an output current of the DC power.

In still further general aspect of the present disclosure, there is provided a universal charging device, the device comprising: a charging pack formed with an AC/DC converter rectifying an inputted AC power where the charging pack is arranged in a singular manner or a plural manner to output a DC power of a first DC power value; a plurality of connectors which is a charging interface; and a mesh unit that connects the charging pack and the connector for adjusting at least one of a serial connection status of the charging pack, a parallel connection status of the charging pack, and an electrical connection status of each of the charging packs and the connectors, wherein a DC power of various power values increasing and/or decreasing the first power value for adjusting the charging speed is applied to each of the connectors through the mesh unit.

Preferably, the universal charging device includes a single charging module or a plurality of charging modules in which a plurality of charging packs is arranged, wherein the mesh unit includes a series/parallel set-up unit, and the series/parallel set-up unit mutually connects the plurality of charging packs or the plurality of charging modules in parallel to increase or decrease the first power value, or mutually connects the plurality of the charging packs or the plurality of charging modules in series, to thereby vary an output voltage.

Preferably, the mesh unit includes a power side mesh unit provided at a power side on which the charging packs or the charging modules are positioned, and a load side mesh unit provided at the kiosk, wherein the power side mesh unit makes a tree connection structure among the charging packs or the charging modules to a variable structure, and the load side mesh unit makes the power side mesh unit and a tree connection structure of each connector to a variable structure.

Preferably, the universal charging device includes a single charging module or a plurality of charging modules in which a plurality of charging packs is arranged, wherein the mesh unit connects the charging packs or the charging modules to each connector in a tree structure, and a power value or an output voltage applied to the connector is adjusted if the tree structure of the mesh unit is changed.

Preferably, the universal charging device is configured in such a manner that r number of positive integers including a first connector to rth connector are installed at a kiosk, wherein the kiosk is arranged with q number of positive integers including a first kiosk to a qth kiosk, and wherein each of the first kiosk to the qth kiosk is connected to an output terminal of the charging pack or the charging module through a first power side relay to a qth power side relay, and wherein each of the first connector to the rth connector is connected to a first power side relay to the qth power side relay through a first load side relay to a rth load side relay, and wherein a power value outputted from any one connector among the first connector to the rth connector is adjusted from a reference power value outputted from the charging pack or the charging module to a zero, and the power value is adjusted with a value dividing the reference power value by $r*q$ as a minimum unit in response to whether each of the relays is turned on or off.

In still further general aspect of the present disclosure, there is provided a universal charging device, the device comprising: an AC/DC conversion block receiving an AC power and converting the AC power to a DC power; a plurality of DC/DC conversion blocks connected to an output terminal of the AC/DC conversion blocks and for converting a voltage or a current of the DC power outputted from the AC/DC conversion blocks; a mesh unit connected to an output terminal of the DC/DC conversion blocks and for outputting various power values for increasing and/or decreasing a first power value outputted from the DC/DC conversion blocks; and a connector connected to the mesh unit and functioning as a charging interface.

Preferably, the mesh unit includes at least one of a serial/parallel set-up unit connecting the plurality of DC/DC conversion blocks in series or in parallel to increase and/or decrease the first power value or vary an output voltage, a power side mesh unit making a tree connection structure among the DC/DC conversion blocks to a variable structure, and a load side mesh unit making the power side mesh unit and a tree connection structure of each connector to a variable structure.

Preferably, the mesh unit connects the DC/DC conversion blocks to each connector in a tree structure, and a power value or an output voltage applied to the connector is adjusted if the tree structure of the mesh unit is changed.

Preferably, the universal charging device is configured in such a manner that r number of positive integers including a first connector to rth connector are installed at a kiosk, wherein the kiosk is arranged with q number of positive integers including a first kiosk to a qth kiosk, and wherein each of the first kiosk to the qth kiosk is connected to an output terminal of the DC/DC conversion blocks through a first power side relay to a qth power side relay, and wherein each of the first connector to the rth connector is connected to a first power side relay to the qth power side relay through a first load side relay to a rth load side relay, and wherein a power value outputted from any one connector among the first connector to the rth connector is adjusted from a reference power value outputted from the DC/DC conversion blocks to a zero, and the power value is adjusted with a value dividing the reference power value by $r*q$ as a minimum unit in response to whether each of the relays is turned on or off.

Technical problems to be solved by the present disclosure are not restricted to the above-mentioned, and any other technical problems not mentioned so far will be clearly appreciated from the following description by skilled in the art.

Therefore, additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

ADVANTAGEOUS EFFECTS

The universal charging device according to the present disclosure has an advantageous effect in that expansion and change of output power value can be easily accomplished through a multi-tier block structure of charging unit, a charging pack and a charging module, whereby volumization of the universal charging device and a charging speed control can be promptly addressed by the multi-tier structure of the charging unit, an electric vehicle can be intellectually charged using an optimum power value, voltage and current adequate to a user command received through data readable from a BMS from the electric vehicle or a kiosk because mutually different power values, mutually different voltages and mutually different currents can be transmitted for each connector, a charging unit can be separately installed from a kiosk to obtain an installation flexibility of a charging system, and a power value, a voltage and a current can be easily changed for each connector because each of the charging packs and connectors can be variably configured in a mesh structure using various connection means that connect each charging pack and the connector.

The universal charging device according to the present disclosure has another advantageous effect in that the installation number of voluminous AC/DC conversion blocks having a large heating value and consuming lots of installation costs can be minimized, such that the one voluminous AC/DC conversion block can be replaced with a plurality of DC/DC conversion blocks with a smaller size, a less heating value and a less installation cost, where obtainment of variation in output power value and charging capacity can be realized by a variable tree structure of a mesh unit, whereby reduction in installation costs and convenience in maintenance can be accomplished to implement a charging speed control in real time using variation of the power value.

BRIEF DESCRIPTION OF DRAWINGS

The accompanying drawings, which are included to provide a further understanding of the disclosure and are incorporated in and constitute a part of this application, illustrate embodiment of the disclosure and together with the description serve to explain the principle of the disclosure. In the drawings:

FIG. 20 is a block diagram illustrating a mesh unit according to an exemplary embodiment of the present disclosure.

DETAILED DESCRIPTION

Figure 1:
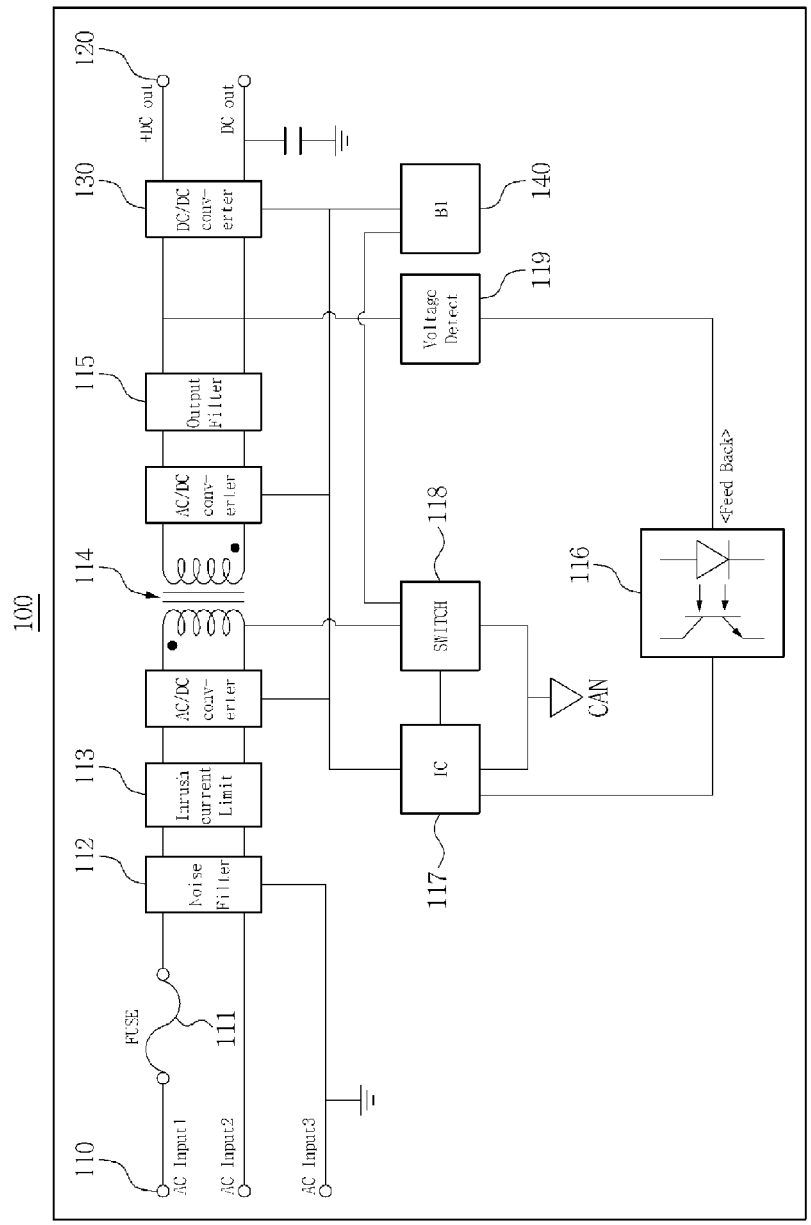
FIG. 1 is a block diagram illustrating a charging pack according to an exemplary embodiment of the present disclosure.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-20 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

Accordingly, the described aspect is intended to embrace all such alterations, modifications, and variations that fall within the scope and novel idea of the present invention.

It will be understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

Figure 2:
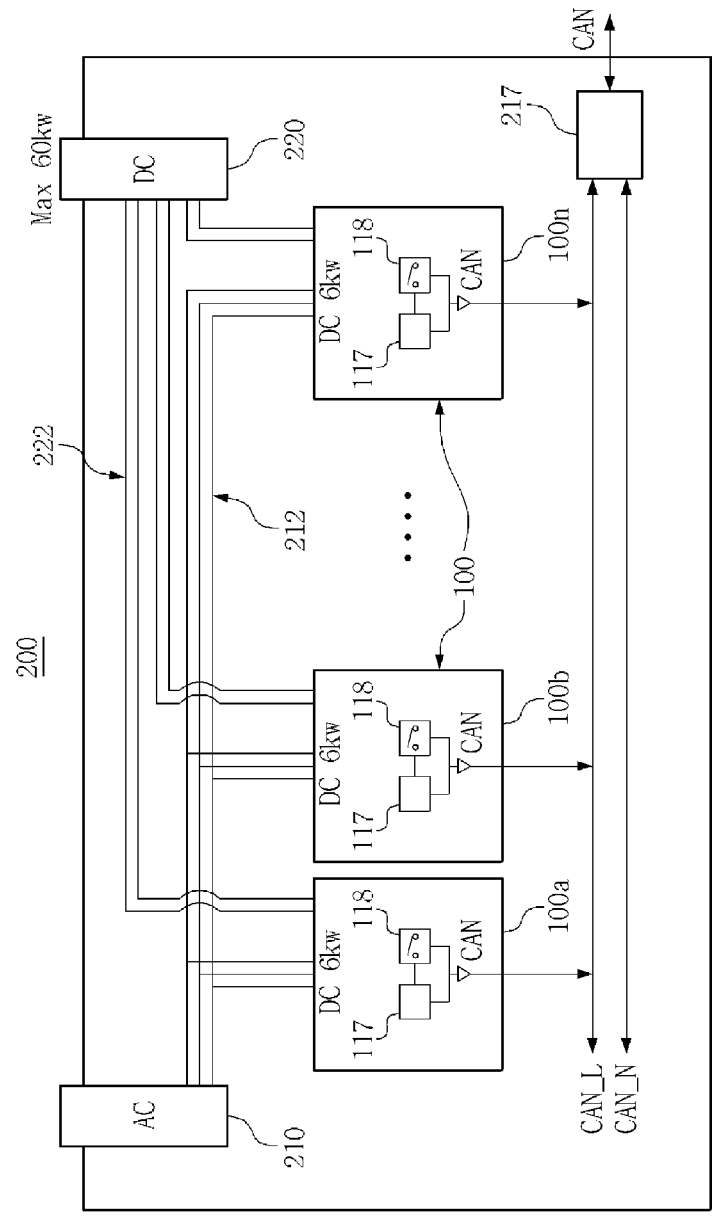
FIG. 2 is a block diagram illustrating a charging module according to an exemplary embodiment of the present disclosure.
Figure 3:
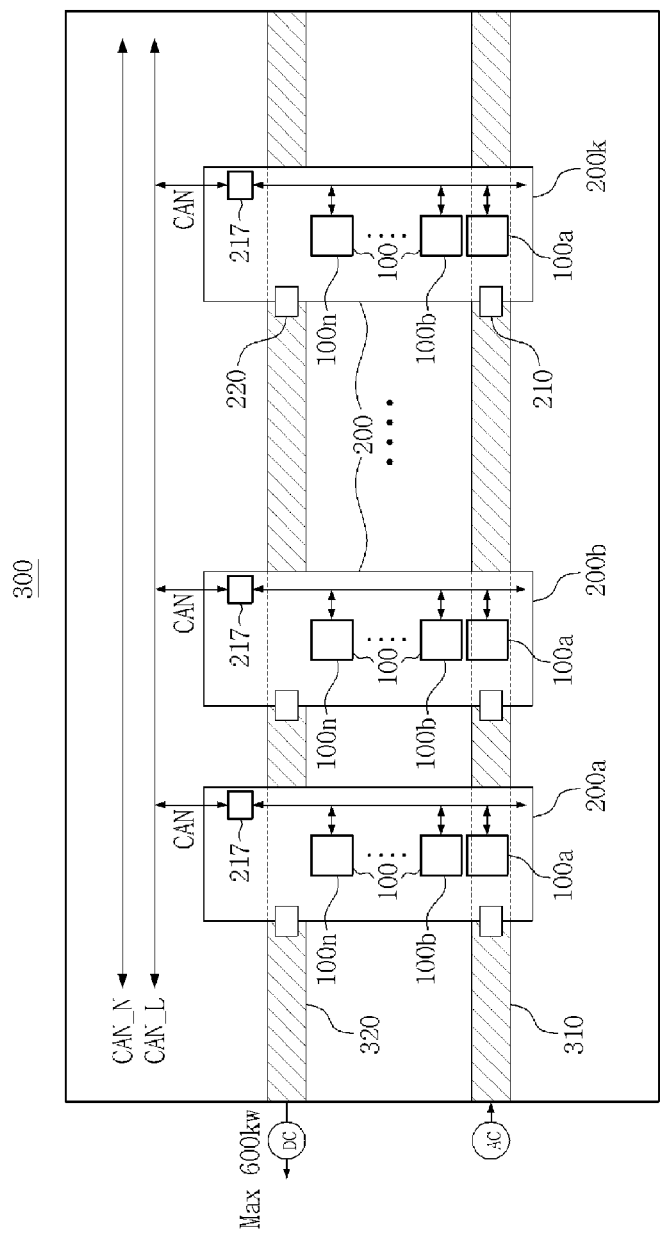
FIG. 3 is a block diagram illustrating a charging unit according to an exemplary embodiment of the present disclosure.

FIG. 1 is a block diagram illustrating a charging pack (100) according to an exemplary embodiment of the present disclosure, FIG. 2 is a block diagram illustrating a charging module (200) according to an exemplary embodiment of the present disclosure, and FIG. 3 is a block diagram illustrating a charging unit (300) according to an exemplary embodiment of the present disclosure.

Referring to FIGS. 1, 2 and 3, a universal charging device according to the present disclosure includes at least any one of a charging pack (100), a charging module (200) and a charging unit (300). The charging pack (100) comprising an AC/DC conversion circuit is defined as a first block, the charging module (200) stacked with charging packs (100) is defined as a second block and the charging unit (300) stacked with charging modules (200) is defined as a third block. Thus, theoretically, the universal charging device can be simply expanded having a limitless power value.

The charging pack (100), the charging module (200) and the charging unit (300) are not general batteries storing a DC power, but an AC/DC conversion means capable of converting an inputted AC power to a DC power, whereby a massive capacity of power value can be outputted in a compact size. Furthermore, the universal charging device according to the present disclosure can obtain a large DC power using a multi-tier block structure alone and is free from a complex circuit requiring a high stability when a high output of DC power is converted using a single circuit.

The charging pack may include at least one of an AC terminal (110), an AC/DC conversion unit (114), a DC terminal (120) and a charging pack switch (118). To be more specific, the charging pack may further include a fuse (111), a noise filter (112), an inrush current limiter (113), an output filter (115), feedback means (116), a driving chip (117), a voltage detector (119), a DC/DC conversion unit (130) and a charging pack battery (140).

The AC terminal (110) is a terminal into which a two-phase or a three-phase AC current power is inputted. The AC power may include various voltages from a 110 voltage to a 540 voltage. The fuse (111) is provided to protect the universal charging device. The noise filter (112) removes noise included in the AC input power. The inrush current limiter (113) blocks input of an excessive current to protect a circuit of the charging packs (100).

The AC/DC conversion unit (114) rectifies the AC input power to a DC output power. The output filter (115) removes a ripple component of the DC output power outputted from the AC/DC conversion unit (114). The AC/DC conversion unit (114) is controlled by the driving chip (117) to adjust an output voltage or an output current of DC power in the charging pack (100) in response to a command from a main controller (500). The multiplication of the output voltage by the output current becomes a first power value outputted from the DC terminal (120).

The DC/DC conversion unit (130) is provided to adjust a predetermined voltage output, a predetermined output voltage, a predetermined current output and an output current, where voltage of DC output power is increased or decreased.

The DC terminal (120) is a terminal transmitting a DC output power outputted from the AC/DC conversion unit (114) or the DC/DC conversion unit (130) to outside. The voltage detector (119) is a sensor that detects a voltage of the DC power output toward the DC terminal (120) and transmits the detected voltage to the driving chip (117) through the feedback means (116). Therefore, the main controller (500) or the driving chip (117) can control the operation of the AC/DC conversion unit (114) to adjust at least one of size of a first power value outputted from the DC terminal (120), the output voltage, and the output current. The charging pack (140) is used as an emergency power.

The charging pack switch (118) controls the operation of the AC/DC conversion unit (114) to turn on or turn off the DC power outputted from the DC terminal (120). If the charging pack switch (118) is turned on, the DC power is normally outputted from the DC terminal (120) of the charging pack (100), and if the charging pack switch (118) is turned off the DC power outputted from the DC terminal (120) of the charging pack (100) is blocked.

The driving chip (117) automatically turns on or turns off the charging pack switch (118) based on a control command inputted from outside through a communication scheme of a CAN (Controller Area Network), and controls the operation of various power elements installed inside the charging pack (100).

The charging pack (100) may be so controlled as to output a variable voltage or a variable current, and outputs a DC power of the first power value which is a constant, when a constant voltage or a constant current is controlled.

At this time, in order to increase the power value, a plurality of charging packs (100) is mounted, where the plurality of charging packs (100) is connected in parallel. The charging pack (100) outputs from the first power value of 6 Kw to a DC power of various power values (e.g., 6 Kw, 12 Kw, 600 Kw) corresponding to positive integer times of the first power value.

For example, if 10 charging packs (100) are installed, and 10 charging pack switches (118) are turned on, a DC power value of 60 Kw is outputted to enable a quick charging or a charging of a heavy-duty vehicle, and if only five charging pack switches (118) are turned on, a DC power value of 30 Kw can be outputted. Thus, it is possible to adjust a power value change of DC power and a charging speed of electric vehicle by controlling a variable block structure.

Meanwhile, in the above exemplary embodiment of the present disclosure where only a plurality of charging packs (100) is stacked to complete one charging block, the power value can be easily increased by adjustment of the number of charging packs (100) having a first power value or ON/OFF of the charging pack switch (118), such that increase of power value is theoretically unlimited.

The charging module (200) is formed by a plurality of charging packs (100) connected in series or in parallel, and can receive an AC power through an AC input portion (210) and can be controlled in operation from outside by data communication. To this end, the charging module (200) includes at least one of arrangement of charging packs (100), the AC input portion (210), a DC output portion (220) and a charging module controller (217) that controls an internal operation of the charging module (200).

The data communication is preferably connected to a communication scheme of a CAN (Controller Area Network), an RS-232C or an RS-485 communication protocol. The CAN has a high data processing speed, a robust immunity to electrical failure, and a high error detection and calibration capacity, and therefore, is adequate to a control system sensitive to noise like the electric vehicle. The CAN uses CAN_L and CAN_N lines to input and output data.

The AC input portion (210) receives an AC power through the AC terminal (110) of each charging pack (100) and an AC connection line (212). The DC output portion (220) where the DC terminal (120) of the charging pack (100) is connected to a DC connection line (222) is a part that outputs an increased power value.

The charging module controller (217) data-communicates with the charging pack (100) to individually control ON/OFF operation of the charging pack switch (118) for each charging pack (100). The power value of the DC power outputted from the DC output portion (220) is changed based on whether each of the charging pack switch (118) is turned on or turned off by the charging module controller (217).

At this time, the plurality of charging packs (100) can be simultaneously attached or detached as the charging module (200) as a unit, and the charging module controller (217) can turn on or turn off each charging pack switch (118) in a simple one-touch operation, such that individual controllability of each charging pack (100) is easy.

The charging unit is formed by a plurality of charging modules being attachably and detachably coupled, where the plurality of charging modules is connected in series or in parallel. An AC bus bar (310) receives an AC power by the AC input portions (210) of each charging module (200) being commonly connected, and a DC bus bar (320) outputs increased or decreased power values by the DC output portions (220) of each charging module (200) being connected in series or in parallel.

The AC power is inputted into the charging unit (300) through the AC bus bar (310), distributed per charging module (200) through the AC terminal (110), and is commonly inputted per the charging pack (100) through the AC terminal (110). The DC power of the DC terminal (120) outputted from the each charging pack (100) as a first power value can be adjusted through the DC output portion (220) and the DC bus bar (320).

At this time, the power value of DC power outputted from the DC bus bar (320) can be changed in proportion to the number of charging modules (200) mounted at the charging unit (300). For example, the charging unit (300), in which 10 charging modules (200) having a DC output of 60 Kw are connected, has a DC output of 600 Kw proportionate to the number of charging modules (200).

As illustrated, the present exemplary embodiment of the present disclosure is such that, instead of configuring a charging module (200) by stacking the charging packs (100), a charging module {200, e.g., a charging module having the AC/DC conversion unit (114) with a 60 Kw power value} comprised of a single circuit is first configured, and then the charging modules are stacked to complete the charging unit (300).

Figure 4:
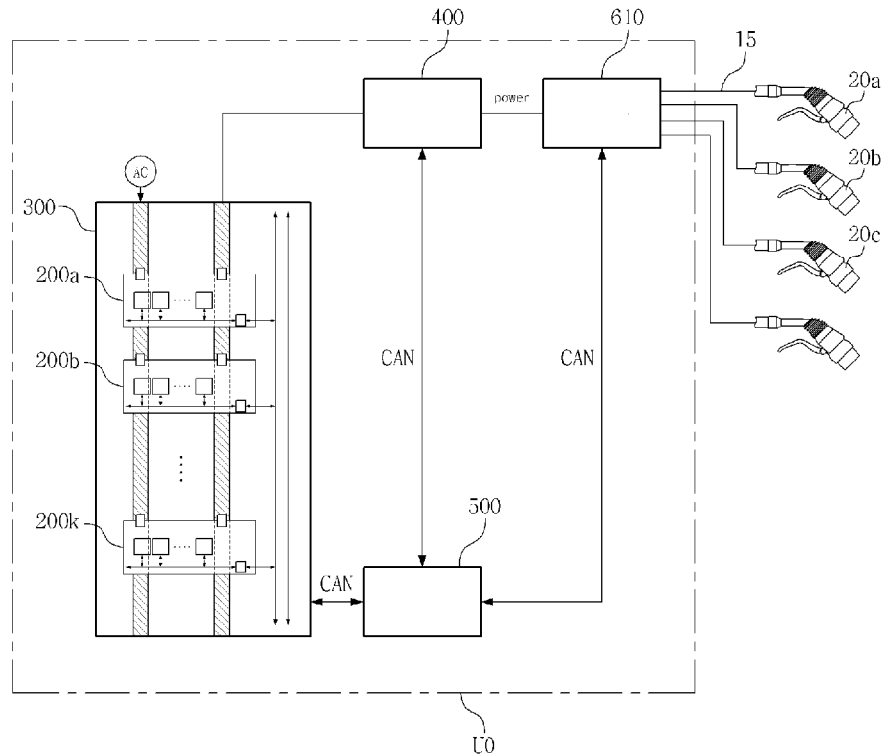
FIG. 4 is a block diagram illustrating a universal charging device according to an exemplary embodiment of the present disclosure.

FIG. 4 is a block diagram illustrating a universal charging device according to an exemplary embodiment of the present disclosure.

FIGS. 1 through 4 illustrate a universal charging device in which a charging unit (300), a main controller (500), a display portion (610), connectors (20a, 20b, 20c) and a power transmission unit (400) are installed in an integral stand (U0) type. Each of the connectors (20a, 20b, 20c) is connected to an EV battery and a BMS (Battery Management System) that are installed inside an electric vehicle, and a connector line (15) includes a power line applied with a DC power, and a signal line where data is inputted or outputted.

The display portion (610) displays a total charged level through the connectors (20a, 20b, 20c). The power transmission unit (400) transmits the DC power generated by the charging unit (300) to each of the connectors (20a, 20b, 20c) through the connector line (15).

The main controller (500) data-communicates with the charging unit (300) mounted at the charging module controller (217) to individually control the charging module controller (217) for each charging module (200) and to turn on or turn off the charging pack switch (118) mounted at each charging pack (100).

Figure 5:
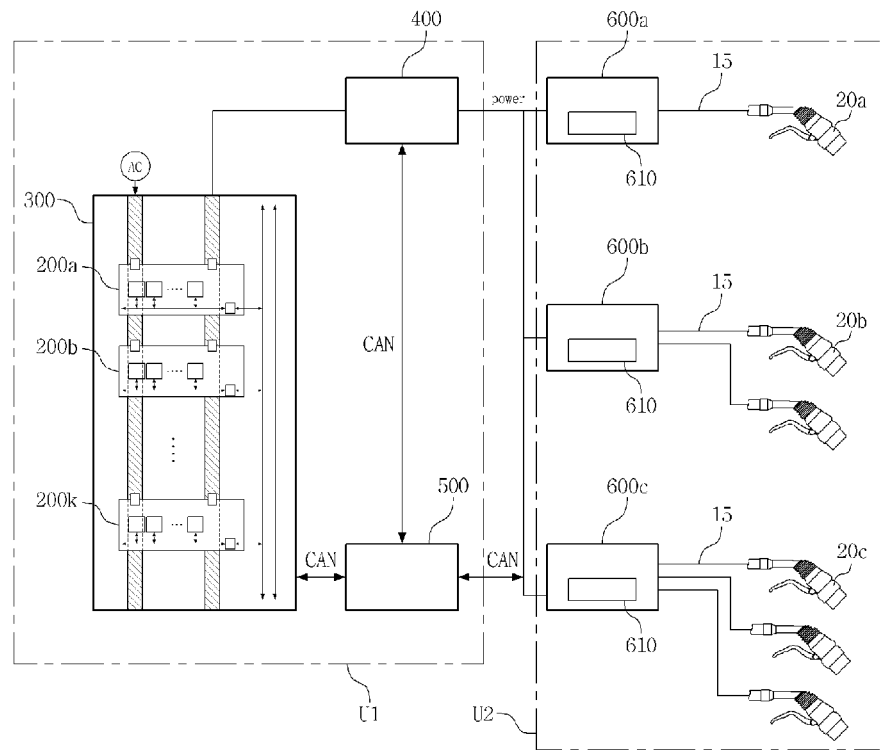
FIG. 5 is a block diagram illustrating a universal charging device according to another exemplary embodiment of the present disclosure.
Figure 6:
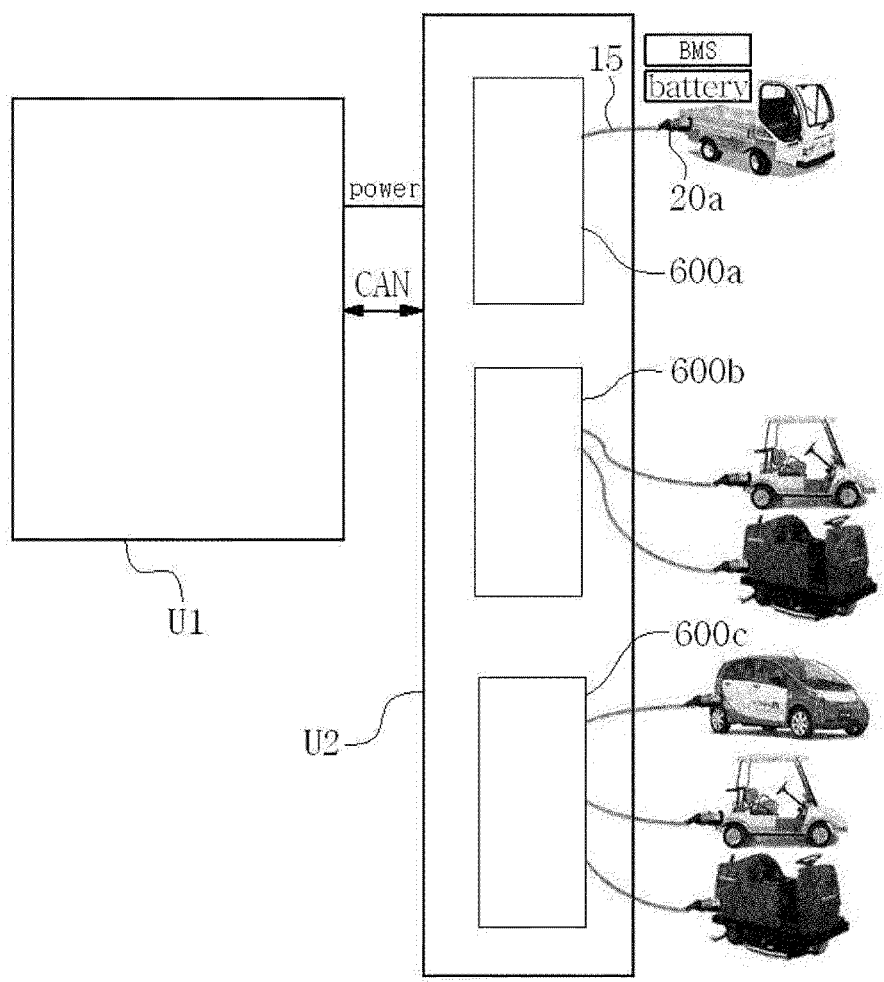
FIG. 6 is a schematic visualized drawing of the exemplary embodiment of the present disclosure in FIG. 5.

FIG. 5 is a block diagram illustrating a universal charging device according to another exemplary embodiment of the present disclosure, and FIG. 6 is a schematic visualized drawing of the exemplary embodiment of the present disclosure in FIG. 5.

Referring to FIGS. 5 and 6, the charging unit (300) and the kiosk (600a, 600b, 600c) are separately provided and installed at separate places. That is, two blocks of an indoor unit (U1) including the charging unit (300), the power transmission unit (400) and the main controller (500), and an outdoor unit (U2) including the kiosk (600a, 600b, 600c) and the connectors (20a, 20b, 20c) are respectively installed at separate positions.

The indoor unit (U1) is free from issues such as water-resistance and electrical insulation, and can be embedded underground like a storage tank of a filling station to greatly reduce an installation space. In case a universal charging device is installed at a convenience store or a supermarket, the indoor unit (U1) including the charging unit (300) may be installed at a warehouse, and the outdoor unit (U2) including the kiosk (600a, 600b, 600c) may be installed at an entrance side bustling with people and accessibility-convenient for electric vehicles. Thus, a large capacity of universal charging device can be easily installed utilizing a crawl space efficiently.

The indoor unit (U1) and the outdoor unit (U2), each discrete from the other, are connected by two types of connection lines including a power line and a signal line, and can adjust an installation area or a discrete distance from each element.

The kiosk (600a, 600b, 600c) may be installed singly or plurally, include a plurality of connectors (20a, 20b, 20c) and a display portion (610) indicating a charged level, and be inputted with a user command.

The main controller (500) data-communicates with the BMS, the power transmission unit (400) and the charging unit (300), and recognizes at least one of a charged status of an electric vehicle grasped through the BMS, a temperature and an operation status of the charging pack (100) grasped through the driving chip (117) provided at the charging pack (100), a temperature and an operation status of the charging pack (100) or the charging module (200) grasped through the charging module controller (217) and a user command inputted to the kiosk (600a, 600b, 600c).

Thus, the main controller (500) can automatically determine a power value of DC power for each connector (20a, 20b, 20c), an output voltage, an optimum value of the output current. For example, the first connector (20a) installed at the first kiosk (600a) outputs a high power value for use in quick recharging, and is used for a heavy-duty vehicle or for an electric vehicle that has paid for a quick charging cost.

Meanwhile, it is assumed that a charging voltage of a small-sized electric vehicle is 72V and a charging voltage for an electric forklift is 320V. The main controller (500) determines whether to set an output voltage of the DC power at 72V or 320V based on type of a vehicle inputted to the kiosk (600a, 600b, 600c) or information read from the BMS, to which connector (20a, 20b, 20c) 320V is applied and how much the output power value is to be increased based on a charging speed or the number of vehicles to be charged. As a result, operations of the driving chip (117) of the charging pack (100), the charging module controller (217) of the charging module (200) and the power transmission unit (400) can be automatically controlled.

The charging module (200) is arranged in series or in parallel with a first charging pack (100a) to an nth charging pack (100n) of the charging pack (100) generating the DC power of the first power value exemplified as 6 Kw. The charging unit (300) is attachably and detachably arranged in series or in parallel with a first charging module (200a) to a kth charging module (200k) of the charging module (200), where n and k are positive integers The main controller (500) supplies, per connector (20a, 20b, 20c), power values from a first power value (e.g., 6 Kw), which is an output value of the charging pack (100), to a DC power of various power values in which the first power value is increased or decreased, based on the charging pack (100) received from the data communication, the charging module (200), the charging unit (300), the kiosk (600a, 600b, 600c), the installed number of BMSs or operations status.

For example, in a case n is 10 and k is 1, a power value of maximum 60 Kw can be supplied to the connectors (20a, 20b, 20c), and a power value of maximum 120 Kw can be supplied to the connectors (20a, 20b, 20c), in a case one more charging module (200) is added to allow k to be 2.

The main controller (500) turns on or turns off the charging pack switch (118) per charging pack (100) to selectively connect a particular charging pack (100) among from the first charging pack (100a) to the nth charging pack (100n) to the kiosk (600a, 600b, 600c). For example, in a case only one charging pack switch (118) is turned on, and the charging pack switch (118) in other charging pack is turned off, a maximum 6 Kw can be outputted.

Meanwhile, in a case the main controller (500) selects a particular charging module (100) among from a first charging module (200a) to a kth charging module (200k) and connects same to the DC bus bar (320), a power value of DC power outputted from the DC bus bar (320) is adjusted. That is, the DC power value can be changed by a passive control variation such as the installed number of charging module (200) and by the control operation of actively selecting the charging module (200). Mutually different power values, mutually different voltages and mutually different currents per connector (20a, 20b, 20c) can be outputted.

Figure 7:
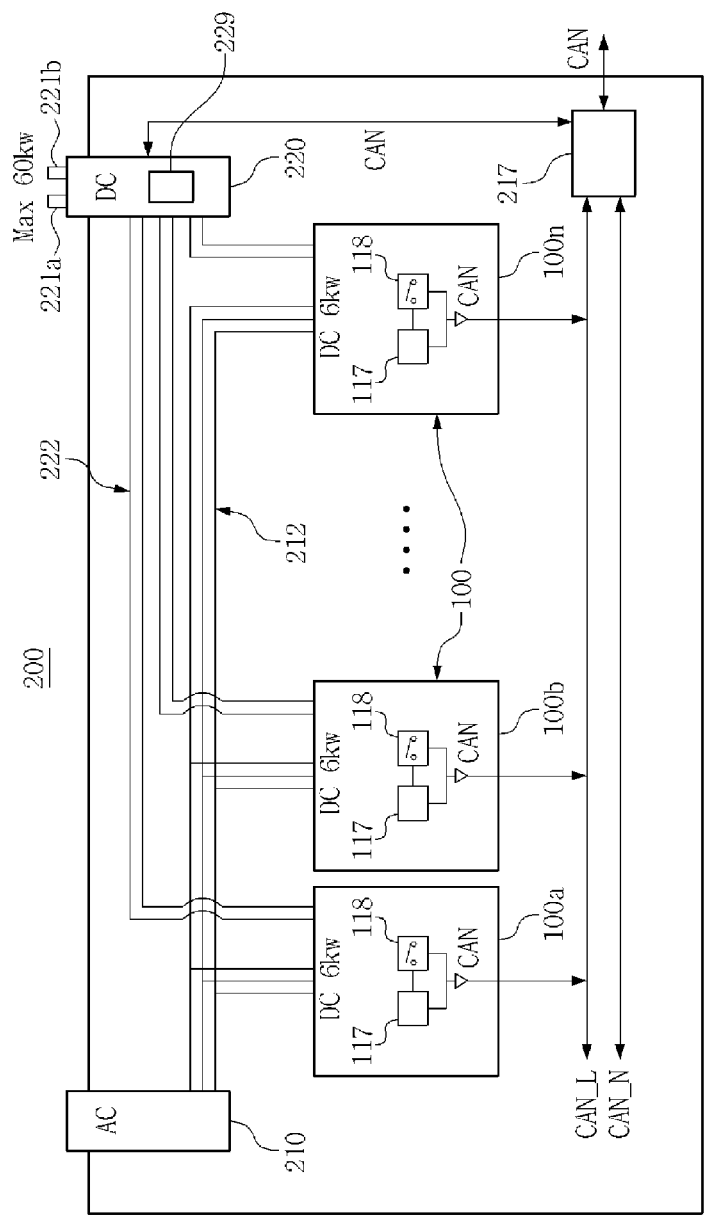
FIG. 7 is a block diagram illustrating a charging module according to another exemplary embodiment of the present disclosure.
Figure 8:
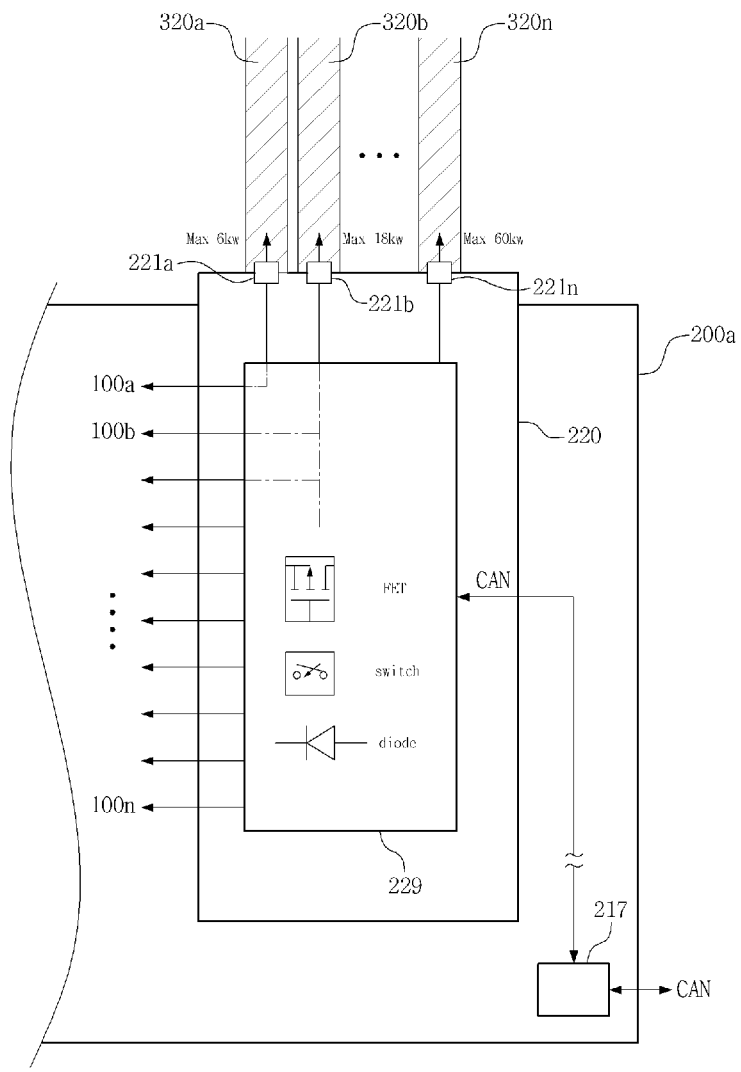
FIG. 8 is a block diagram illustrating in detail a DC output portion and a plurality of DC bus bars according to the exemplary embodiment of the present disclosure in FIG. 7.
Figure 9:
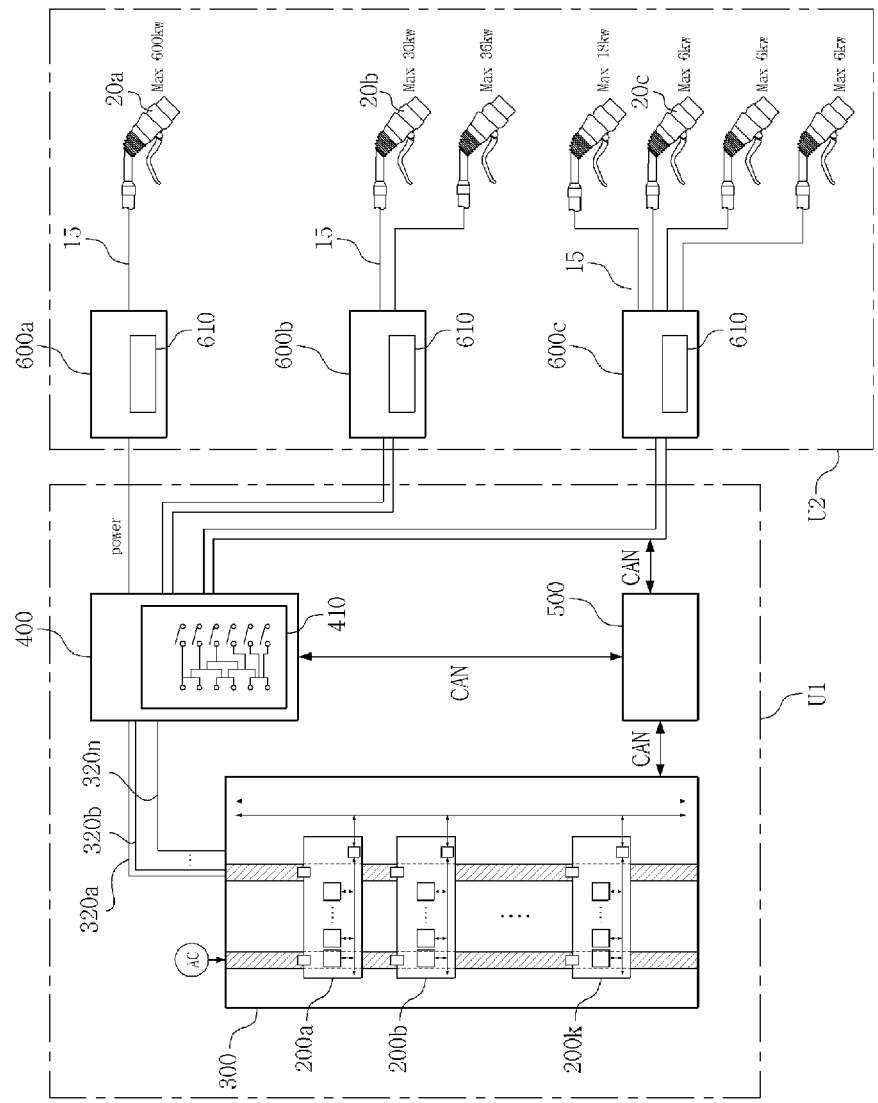
FIG. 9 is a block diagram illustrating a universal charging device of FIGS. 7 and 8 according to another exemplary embodiment of the present disclosure.

FIG. 7 is a block diagram illustrating a charging module according to another exemplary embodiment of the present disclosure, FIG. 8 is a block diagram illustrating in detail a DC output portion and a plurality of DC bus bars according to the exemplary embodiment of the present disclosure in FIG. 7, and FIG. 9 is a block diagram illustrating a universal charging device of FIGS. 7 and 8 according to another exemplary embodiment of the present disclosure.

Referring to FIGS. 7, 8 and 9, at least one of a DC switch unit (229) and variable relay unit (410) is installed.

The DC switch unit (229) selects at least part of the DC terminal (120) and connects in a plurality of combinations. At this time, it is preferable that the DC bus bar (320) be provided in several strands including a first DC bus bar (320a), a second DC bus bar (320b), and an nth DC bus bar (320n). Thus, mutually different power values/voltages/currents for each DC bus bar (320a, 320b . . . 320n) can be outputted, or mutually different power values/voltages/currents for each connector (20a, 20b, 20c) can be outputted. A variable relay unit (410) selects at least some of the DC bus bars (320a, 320b . . . 320n) and connects the selected DC bus bars in parallel in a plurality of combinations.

The DC switch unit (229) may be installed at the DC output portion (220) of the charging modules (200a . . . 200k), and the variable relay unit (410) may be installed at the power transmission unit (400) corresponding to output sides of the DC bus bars (320a, 320b . . . 320n).

The main controller (500) may control at least one operation of the DC switch unit (229) or the variable relay unit (410) to selectively connect a particular charging pack among from the first charging pack (100a) to the nth charging pack (100n), or to selectively connect a particular charging module among the charging modules from a first charging module (200a) to a kth charging module (200k).

Function of the DC switch unit (229) can be explained in detail by referring to FIG. 8. The first DC bus bar (320a) is connected to only one first charging pack (100a), such that 6 Kw corresponding to the first power value of the charging pack (100) becomes the maximum output, for example. The second DC bus bar (320b) is connected to three charging packs including the second charging pack (100b), the third charging pack (100c) and the fourth charging pack (100d), such that 18 Kw is the maximum output. The nth DC bus bar (320n) is connected in parallel to the first charging pack (100a) to the nth charging pack (100n), such that 60 Kw is the maximum output, where n is 10.

At this time, which charging pack is to be connected to each of the DC bus bar (320) and how many charging packs are to be connected can be changed as many as possible by the main controller (500) or the charging module controller (217). The DC switch unit (229) is installed with a combination circuits including FET, hardware switch and diode as a switching means controlled in operation by the charging module controller (217).

The DC switch unit (229) connects a charging pack selected among from the first charging pack (100a) to the nth charging pack (100n) to a DC bus bar selected among from the first DC bus bar (320a) to the nth DC bus bar (320n) according to a command inputted from the charging module controller (217).

For example, the DC switch unit (229) may disconnect the first DC bus bar (320a) and all the charging packs of the first charging module (200a), and disconnect the first DC bus bar (320a) and all the charging packs of the second charging module (200b). In this case, the DC power may not be outputted through the first DC bus bar (320a).

In a case a DC output portion (220) is provided with the DC switch unit (229) and power plugs (221a, 221b . . . 221n), the DC bus bars (320a . . . 320n) are provided in several strands, and each DC bus bar (320a . . . 320n) is connected to distinguishable DC power plugs (221a, 221b, 221n), mutually different power values can be outputted from each DC bus bar (320a, . . . 320n).

In a case each DC bus bar (320a . . . 320n) is connected with mutually different connectors (20a, 20b, 20c), mutually different power values can be outputted from each connector (20a, 20b, 20c). In a case the main controller (500) outputs voltages or currents that are distinguished per charging pack (100) and charging module (200), mutually different voltages or mutually different currents can be outputted for each DC bus bar (320a . . . 320n) or each connector (20a, 20b, 20c).

Referring to FIG. 9, the variable relay unit (410) is installed at the power transmission unit (400) which is an output side of the DC bus bar (320). The variable relay unit (410) is controlled by the command of the main controller (500), and changes the connectivity between each DC bus bar (320a . . . 320n) and each connector (20a, 20b, 20c).

For example, the first power value of the charging packs (100a . . . 100n) is 6 Kw, each charging module (200a . . . 200k) is installed with 10 charging packs (100) in ON state, the number of charging modules (200a . . . 200k) is 10, which are all connected to the first DC bus bar (320a) to the nth DC bus bar (320n), and the variable relay unit (410) connects all the first DC bus bar (320a) to the nth DC bus bar (320n) to the first kiosk (600a), the maximum power value of the first kiosk (600a) becomes 600 Kw.

Figure 10:
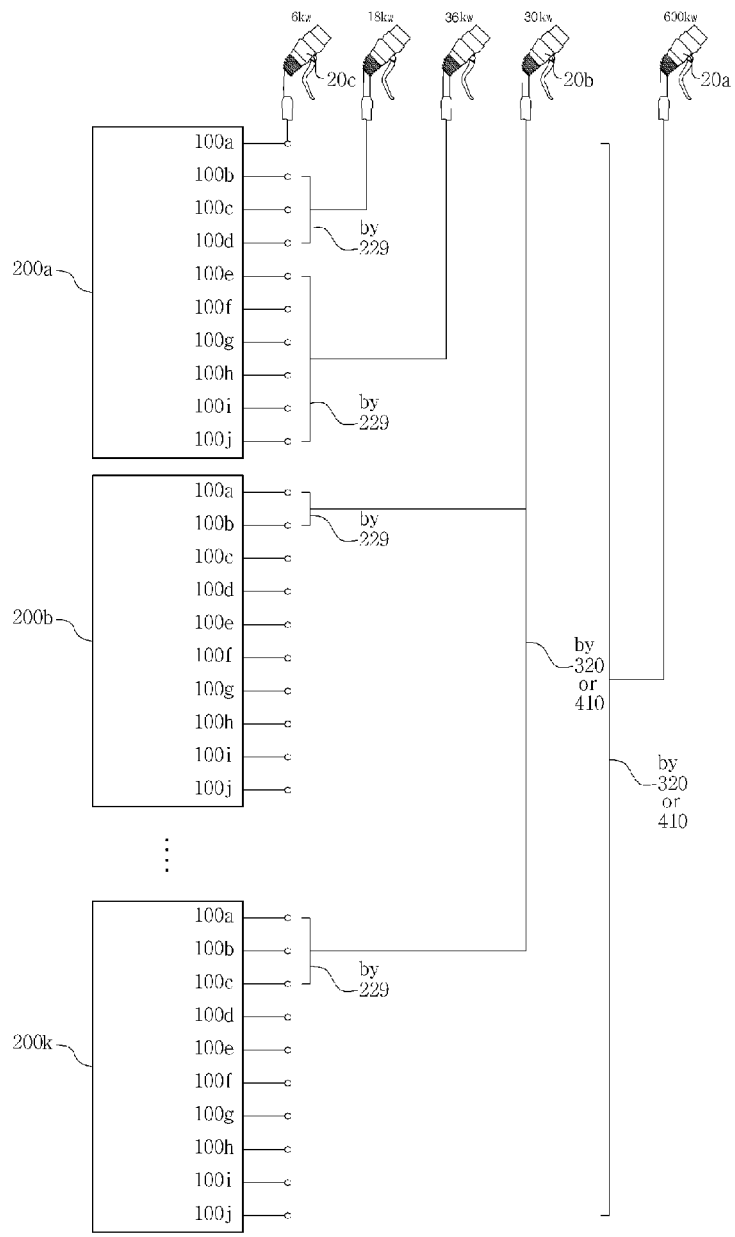
FIG. 10 is a schematic view explaining a variable configuration of a DC power value according to the present disclosure.

The maximum output of the third connector (20c) illustrated in FIG. 10 is 6 Kw. At this time, in a case the DC switch (229) connects only the first charging pack (100a) of the first charging module (200a) to the third connector (30c) while other charging modules and charging packs are disconnected, only the first charging pack (100a) of the first charging module (200a) is connected to any one DC bus bar (320) from the first DC bus bar (320a) to the nth DC bus bar (320n). The variable relay unit (410) connects any one DC bus bar to the third connector (20c) and blocks connection of other DC bus bars and other connectors. Therefore, the third connector (20c) is connected to only the first charging pack (100a) of the first charging module (200a) through one DC bus bar, where the maximum output of the third connector is 6 Kw.

A maximum output of the third connector (20c) illustrated in FIG. 10 is 6 Kw, for example. At this time, the DC switch unit (229) connects only the first charging pack (100a) of the first charging module (200a) to the third connector (20c), where other charging modules and other charging packs are blocked in connectivity, and only the first charging pack (100a) of the first charging module (200a) is connected to any one DC bus bar among from the first DC bus bar (320a) to the nth DC bus bar.

Furthermore, the variable relay unit (410) connects any one DC bus bar to the third connector (20c) and blocks connectivity of other DC bus bars and other connectors. Therefore, the third connector (20c) is connected only to the first charging pack (100a) of the first charging module (200a) through one DC bus bar, where the maximum output of the third connector is 6 Kw.

A maximum output of the second connector (20b) illustrated in FIG. 10 is 30 Kw, for example. At this time, the DC switch unit (229) connects the first charging pack (100a) and the second charging pack (100b) of the second charging module (200b) to the first charging pack (100a) to the third charging pack (100c) of the tenth charging module in parallel.

In the present exemplary embodiment, charging packs connected to the second connector (20b) are connected to at least one DC bus bar from among the first DC bus bar (320a) to the nth DC bus bar (320n). For example, the variable relay unit (410) connects the second DC bus bar (320) to the second connector (20b) and blocks connection of other DC bus bars.

As noted from the foregoing, the operation of the DC switch unit (229) is automatically controlled by a combination circuit of FET, hardware switch and diode comprising the DC switch unit (229).

Figure 11:
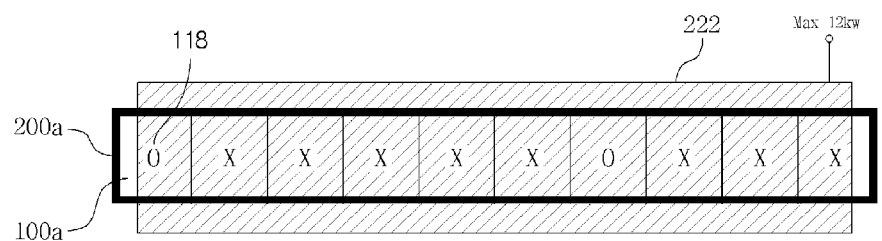
FIGS. 11, 12 and 13 are conceptual views explaining various configurations of a universal charging device and an operation thereof according to the present disclosure.

FIG. 11 shows only one first charging module (200a) that is installed. The DC switch unit (229, see FIG. 8) and the variable relay unit (410) are not provided, only one DC bus bar is provided or all the several DC bus bars are connected in parallel. The turned ON/OFF of the charging pack switch (118) is as illustrated, where '0' shows a turned-on status, and 'X' shows a turned-off status. At this time, the charging unit outputs a maximum power of 12 Kw through a DC connection line (222).

Figure 12:
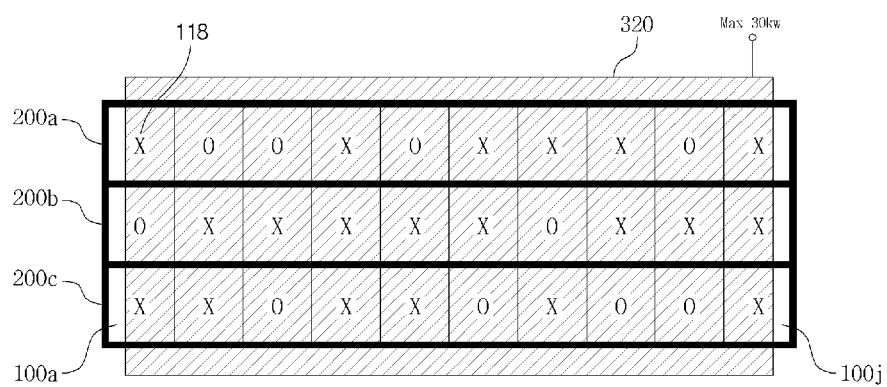

FIG. 12 shows the first charging module (200a) through the third charging module (200c) that are installed. The DC switch unit (229, see FIG. 8) and the variable relay unit (410) are not provided and are not divided to several strands. The turned ON/OFF of the charging pack switch (118) is as illustrated, and the charging unit outputs a maximum power of 30 Kw through a single DC bus bar (320).

Figure 13:
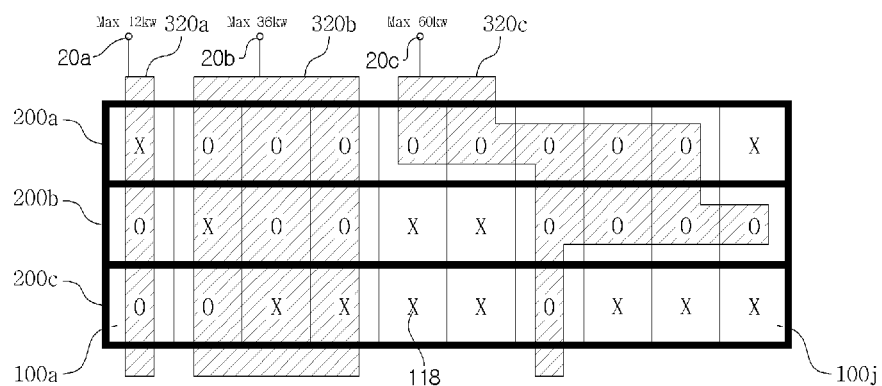
Figure 14:
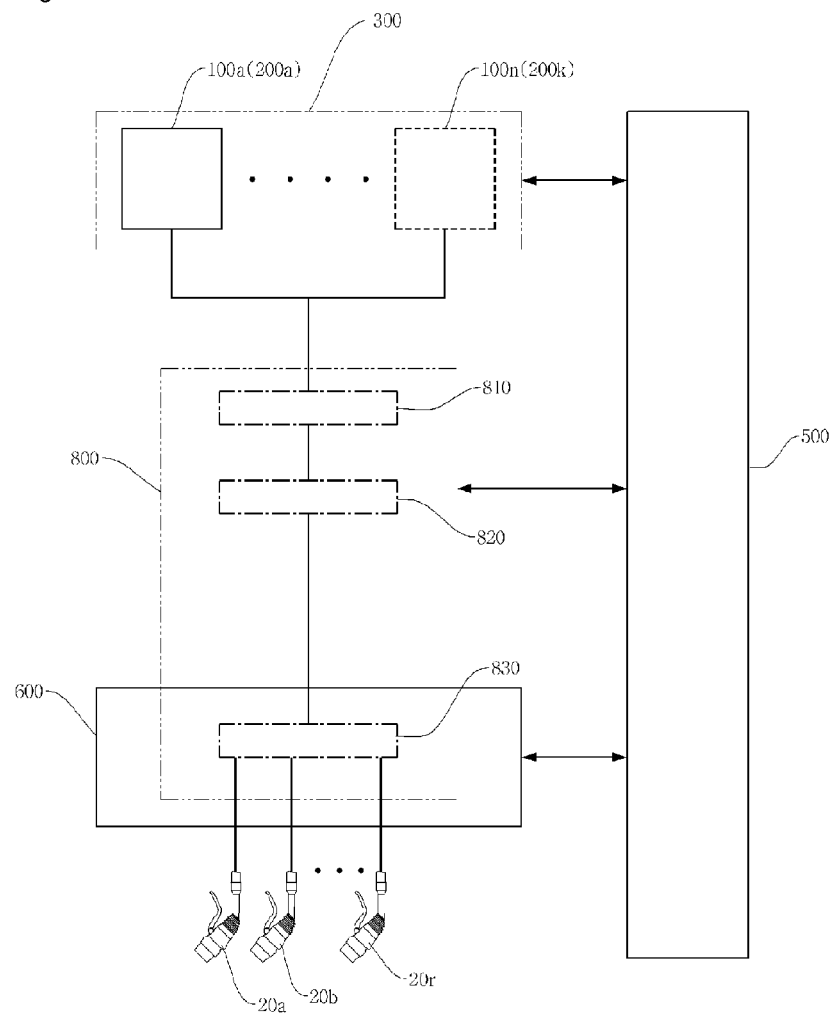
FIG. 14 is a mimetic diagram illustrating a universal charging device according to another exemplary embodiment of the present disclosure.

The DC switch unit (229, see FIG. 8) in FIG. 13 connects the first charging pack (100a) respectively installed at the first charging module (200a), the second charging module (200b) and the third charging module (200c) to the first DC bus bar (320a). The charging unit outputs a maximum power of 12 Kw through the first DC bus bar (320a) based on turned-ON/OFF of respective charging pack switches (118).

Furthermore, the DC switch unit (229, see FIG. 8) connects the second charging pack (100b) through the fourth charging pack (100d) respectively installed at the first charging module (200a), the second charging module (200b) and the third charging module (200c) to the second DC bus bar (320b). The charging unit outputs a maximum power of 36 Kw through the second DC bus bar (320b) based on turned-ON/OFF of respective charging pack switches (118). Therefore, the first connector (20a) connected to the first DC bus bar (320a) outputs a maximum power value of 12 Kw, and the second connector (20b) connected to the second DC bus bar (320b) outputs a maximum power value of 36 Kw.

Now, a mesh unit (800) according to another exemplary embodiment of the present disclosure will be described in detail with reference to FIGS. 14 through 17.

The illustrated mesh unit (800) connects the charging packs (100, 100a, 100b . . . 100n) to the connectors (20a, 20b, 20c), and adjusts at least any one connection status among a serial connection status of charging packs (100, 100a, 100b . . . 100n), a parallel connection status of charging packs (100, 100a, 100b . . . 100n), and electrical connection status between the charging packs (100, 100a, 100b . . . 100n) and the connectors (20a, 20b, 20r). DC power of various power values, in which the first power value of charging packs (100, 100a, 100b . . . 100n) for charging speed adjustment is increased or decreased, is applied to each connector (20a, 20b, 20r) through the mesh unit (800).

The mesh unit (800) connects the charging packs (100, 100a, 100b . . . 100n) or charging modules (200, 200a, 200b, 200k) to each of the connectors (20a, 20b, 20r) in a tree structure. In a case the tree structure of the mesh unit (800) is changed, a power value or an output voltage applied to the connectors (20a, 20b, 20r) is changed. In a case the kiosk (600, 600a, 600b, 600q) are positioned at a place separated from the charging packs (100, 100a, 100b . . . 100n) or charging modules (200, 200a, 200b, 200k), the mesh unit (800) connects the charging packs (100, 100a, 100b . . . 100n)

to the charging modules (200, 200a, 200b, 200k) regardless of distance, and changes the power value, the output voltage and the output current.

The mesh unit (800) includes at least any one of a serial/parallel set-up unit (810), a power side mesh unit (820) and a load side mesh unit (830). To be more specific, the mesh unit (800) may further include the DC output portion (220), the DC switch unit (229), the DC bus bar (320), the power transmission unit (400) and the variable relay unit (410).

Figure 15:
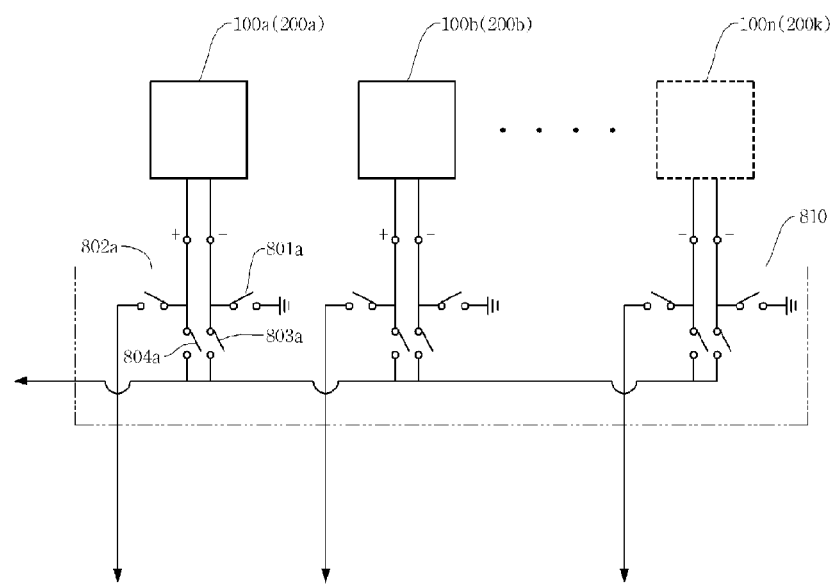
FIG. 15 is a block diagram illustrating a serial/parallel set-up unit of FIG. 14.

The serial/parallel set-up unit (810) illustrated in FIG. 15 interconnects a plurality of the charging packs (100, 100a, 100b . . . 100n), or a plurality of charging modules (200, 200a, 200b, 200k) in parallel to increase or decrease the first power value, or interconnects the plurality of the charging packs (100, 100a, 100b . . . 100n), or the plurality of charging modules (200, 200a, 200b, 200k) in series to vary the output voltage.

In the present exemplary embodiment of the present disclosure, the serial/parallel set-up unit (810) is a unit in which a plurality of relays is connected. In a case at least some of the relays in the serial/parallel set-up unit (810) are selectively turned on or off through the main controller (500) that remote-controls the serial/parallel set-up unit (810), the serial connection or the parallel connection is changed.

For example, in a case a first serial/parallel set-up relay (801a) and a second serial/parallel set-up relay (802a) are turned off, and a third serial/parallel set-up relay (803a) and a fourth serial/parallel set-up relay (804a) are turned on, the plurality of charging packs (100, 100a, 100b . . . 100n) is interconnected in series, or the plurality of charging modules (200, 200a, 200b, 200k) is interconnected in series. At this time, an output voltage can be adjusted depending on turned-ON/OFF of the third serial/parallel set-up relay (803a) and the fourth serial/parallel set-up relay (804a) respectively connected to the charging packs (100, 100a, 100b . . . 100n) or to the charging modules (200, 200a, 200b, 200k).

Meanwhile, in a case the third serial/parallel set-up relay (803a) and the fourth serial/parallel set-up relay (804a) are turned off, and the first serial/parallel set-up relay (801a) and a second serial/parallel set-up relay (802a) are turned on, the plurality of charging packs (100, 100a, 100b . . . 100n) is interconnected in parallel, or the plurality of charging modules (200, 200a, 200b, 200k) is interconnected in parallel. At this time, a power value can be adjusted depending on turned-ON/OFF of the first serial/parallel set-up relay (801a) and the second serial/parallel set-up relay (802a) respectively connected to the charging packs (100, 100a, 100b . . . 100n) or to the charging modules (200, 200a, 200b, 200k).

Figure 16:
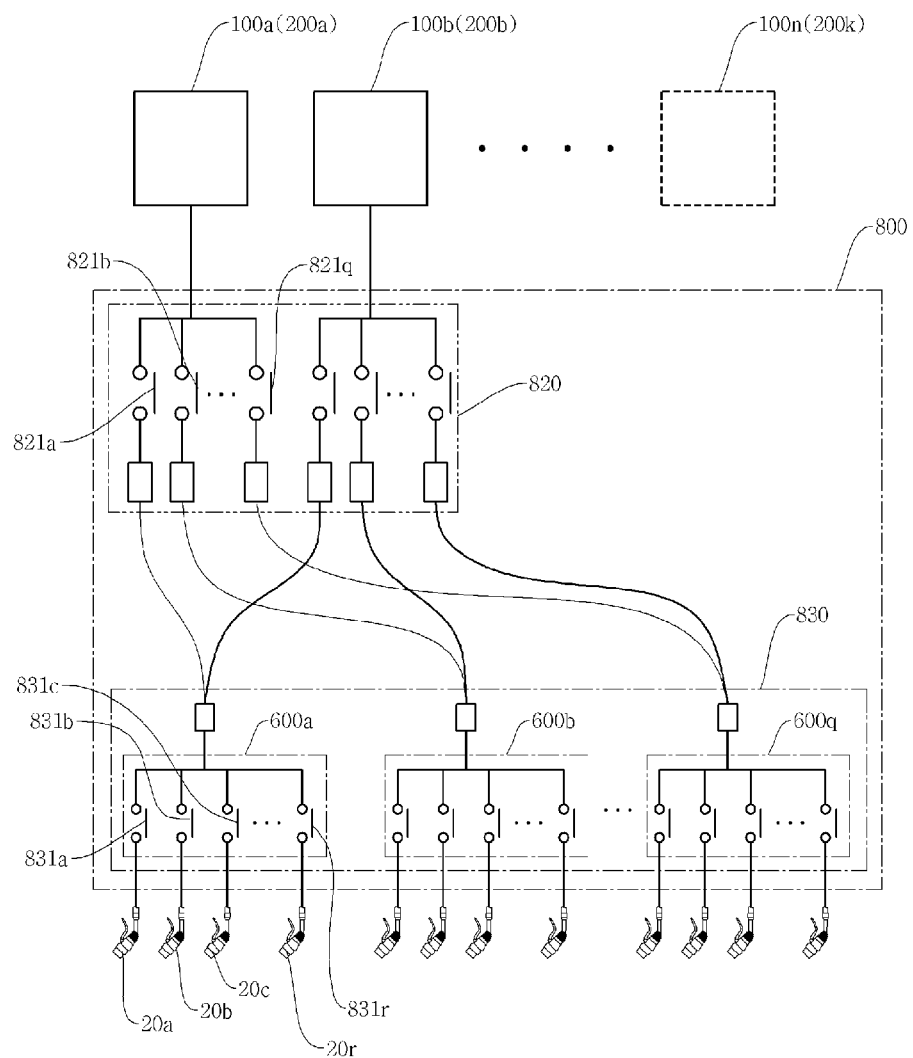
FIG. 16 is a block diagram illustrating a power side mesh unit and a load side mesh unit of FIG. 14.

The power side mesh unit (820) and the load side mesh unit (830) are illustrated in FIG. 16. The power side mesh unit (820) is provided at a power side where the charging packs (100, 100a, 100b . . . 100n) or the charging modules (200, 200a, 200b, 200k) are positioned, and the load side mesh unit (830) is provided at the kiosk (600, 600a, 600b, 600q).

The power side mesh unit (820) changes the tree connection structure of the charging packs (100, 100a, 100b . . . 100n) or the charging modules (200, 200a, 200b, 200k) to a variable structure, and the load side mesh unit (830) changes the tree connection structure of the power side mesh unit (820) and each of the connectors (20a, 20b, 20r) to a variable structure.

That is, r number of connectors in positive integers including the first connector (20a) through the rth connector (20r) are installed at the kiosk (600, 600a, 600b, 600q), and q number of kiosk in positive integers including the first kiosk (600a) through the qth kiosk (600q) are arranged. Each of the first kiosk (600a) through the qth kiosk (600q) is connected to an output terminal of the charging packs (100, 100a, 100b . . . 100n) or the charging modules (200, 200a, 200b, 200k) through a first power side relay (821a) through a qth power side relay (821q). Each of the first connector (20a) through an rth connector (20r) is connected to a first power side relay (831a) or a qth power side relay (821q) through a first load side relay (831a) through an rth load side relay (831r).

At this time, a power value outputted from any one connector from among the first connector (20a) through the rth connector (20r) is adjusted from a reference power value (corresponding to 'the first power value' in the previous explanation) outputted from the charging packs (100, 100a, 100b . . . 100n) or the charging modules (200, 200a, 200b, 200k) to zero. A power value outputted from any one connector from among the first connector (20a) through the rth connector (20r) is adjusted from zero to the reference power value, using the reference power value divided by r*q as a minimum unit in response to whether each of the relays is turned on or off.

For example, it is assumed that the reference power value outputted from the charging packs (100, 100a, 100b . . . 100n) or the charging modules (200, 200a, 200b, 200k) is 60 Kw, where the 'r' is 4, four connectors (20a, 20b, 20r) are installed at each kiosk, the 'r' is 3, and three kiosk are installed.

In a case the first power side relay (821a) through the qth power side relay (821q), and the first power side relay (831a) through the rth load side relay (831r) are all turned off, an output of the connector (20a) is 0 Kw.

In a case only the first power side relay (821a) and the first power side relay (821a) are turned on, and the second power side relay (821b) through the qth power side relay (821q), and the second load side relay (831b) and the rth load side relay (831r) are all turned off, the output of the connector (20a) reaches a maximum value, which is 60 Kw, the same value as the reference value outputted from the charging packs (100, 100a, 100b . . . 100n) or the charging modules (200, 200a, 200b, 200k).

In a case all the first power side relay (821a) through the qth power side relay (821q), and the first power side relay (831a) through the rth load side relay (831r) are all turned on, an output of the connector (20a) is 5 Kw (60/3*4).

Therefore, if the first power side relay (821a) through the qth power side relay (821q), and the first power side relay (831a) through the rth load side relay (831r) are adequately combined, the output values of connectors (20a, 20b, 20r) can be adjusted with a value dividing the reference power value by r*q (5 Kw in the above example) as a minimum unit.

Figure 17:
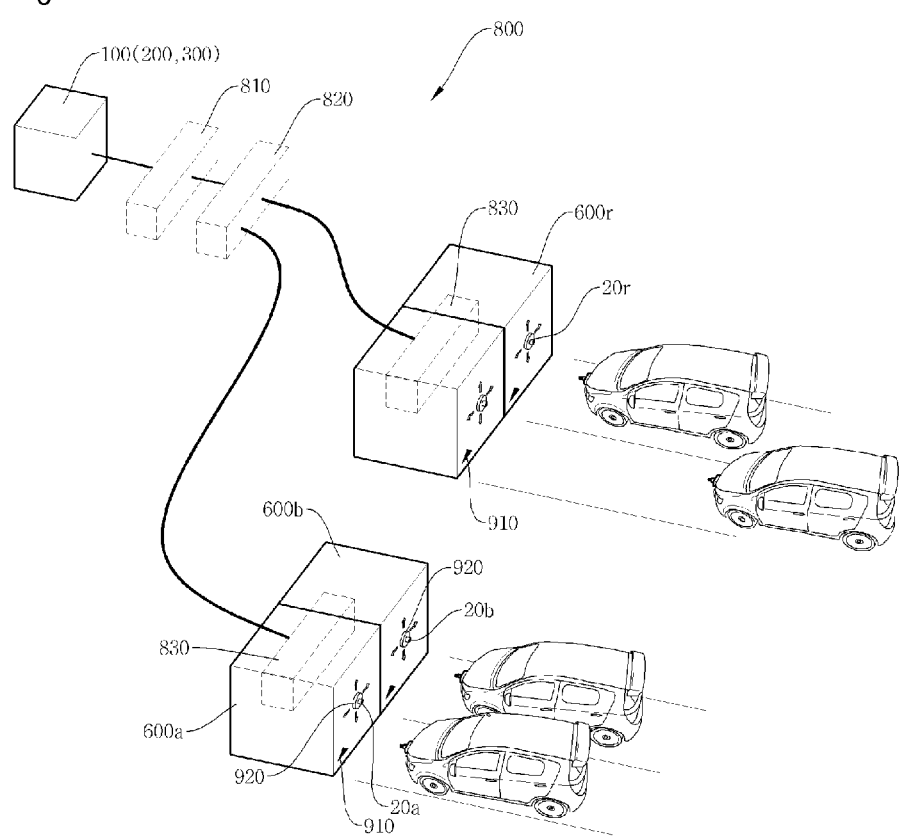
FIG. 17 is a conceptual view explaining charging of an electric vehicle using a universal charging device according to the present disclosure.

Referring to FIG. 17, the charging packs (100, 100a, 100b . . . 100n) or the charging modules (200, 200a, 200b, 200k) are connected to the connectors (20a, 20b, 20r) through the mesh unit (800) having the tree shaped electrical connection circuit, and the variable tree structure of the mesh unit (800) that receives command from the main controller (500) is utilized to vary the power value or the voltage applied to the connectors (20a, 20b, 20r). As a result, an optimized charging including a quick charging, a slow speed charging and a large capacity charging can be realized for each type of electric vehicle.

A detection sensor detects an approach of an electric vehicle and notifies the approach to the main controller (500). The connectors (20a, 20b, 20r) connected to the electric vehicle are connected to a jig, whereby position is automatically adjusted. The main controller (500) grasps the type of electric vehicle and determines an optimum charging mode including a quick charging, a slow speed charging or a large capacity charging based on charging information inputted by a user. The tree structure of the mesh unit (800) is changed by the main controller (500), and the power value or output voltage of the connectors (20a, 20b, 20r) is adjusted.

Figure 18:
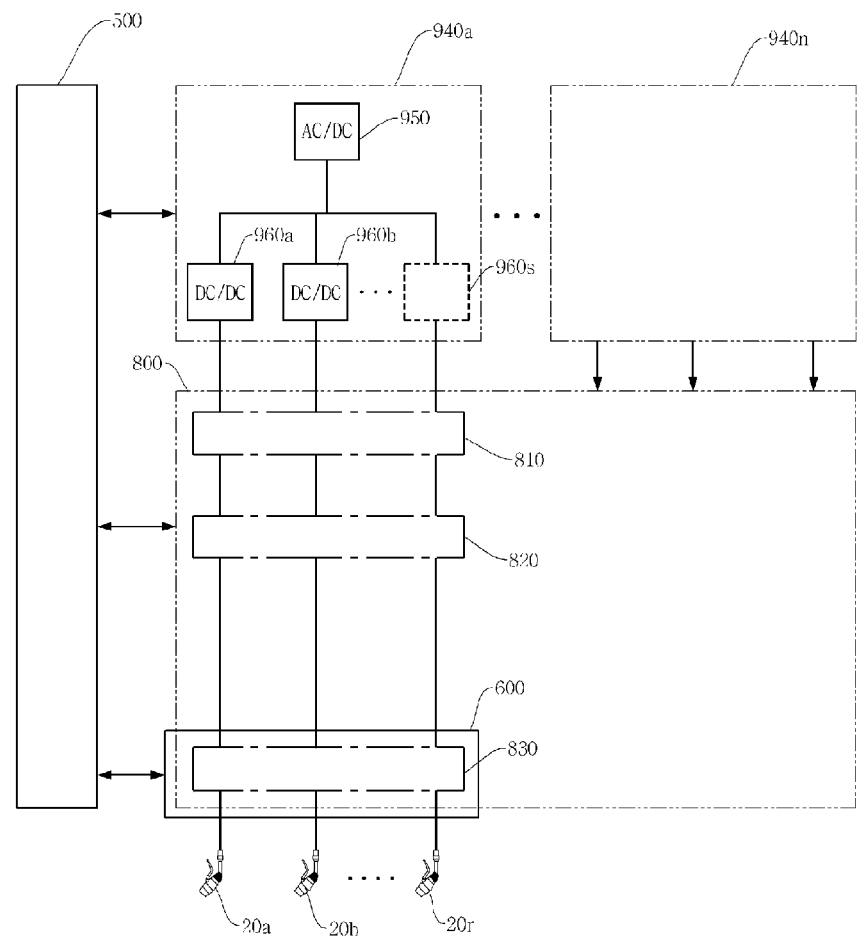
FIG. 18 is a block diagram illustrating a universal charging device according to another exemplary embodiment of the present disclosure.
Figure 19:
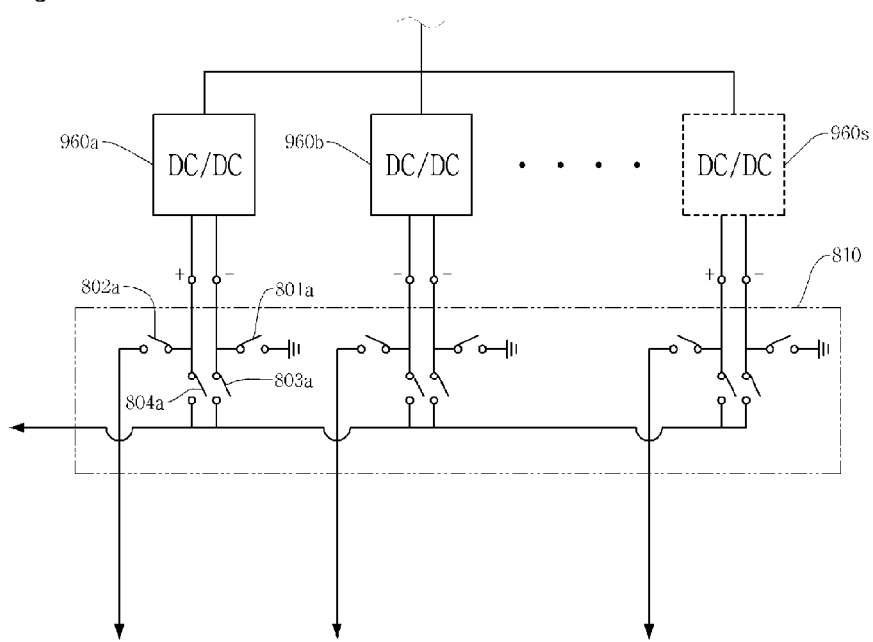
FIG. 19 is a block diagram illustrating a serial/parallel set-up unit of FIG. 18.

FIGS. 18, 19 and 20 illustrates a universal charging device in which a plurality of DC/DC conversion blocks (960a, 960b, 960c) for each AC/DC conversion block (950) is provided, according to an exemplary embodiment of the present disclosure.

In a case a plurality of AD/DC conversion blocks (950) is installed to cope with a quick charging mode, and a slow speed charging mode, the universal charging device tends to be voluminous, to generate a large quantity of heat and to increase an installation cost due to characteristic of the AD/DC conversion blocks (950).

Now, an exemplary embodiment of the present disclosure is provided in which a plurality of DC/DC conversion blocks (960a, 960b, 960c) for each AC/DC conversion block (950) is connected to satisfy various purposes including a high efficiency, a low cost, a low heat generation and occupation of small space.

The exemplary embodiment of the present disclosure is provided to minimize the installation number of AC/DC conversion blocks (950) which are voluminous, generate a large heat and call for a large amount of installation cost, and to provide a plurality of DC/DC conversion blocks (960a, 960b, 960c) for each AC/DC conversion block (950) which are less voluminous, generate less heat and cost less installation expenses. Variation of power values and increase in capacity variation can be realized by variable tree structure of the mesh unit (800).

The universal charging device illustrated in FIGS. 18, 19 and 20 includes an AC/DC conversion block (950), DC/DC conversion blocks (960a, 960b, 960c), a mesh unit (800), and connectors (20a, 20b, 20c, 20r).

The AC/DC conversion block (950) receives an AC power and converts the AC power to a DC power. Each of the AC/DC conversion blocks (950) is connected to s number, in positive integer, of a first DC/DC conversion block (960a) through an sth DC/DC conversion block (960s).

The DC/DC conversion blocks (960a, 960b, 960c) increases or decreases the voltages of a DC input power at a first voltage converted at the AC/DC conversion block (950) and converts to a DC output power of a second voltage. The DC/DC conversion blocks (960a, 960b, 960c) can be manufactured in a small sized DC/DC conversion chip embedded with switching elements, rectifying elements and coils to greatly reduce the volume, installation cost and heat generation over a case where a plurality of AC/DC conversion blocks (950) is installed.

The DC/DC conversion blocks (960a, 960b, 960c) become a first block, and a first conversion block (940a) through an nth conversion block (940n), in which a plurality of DC/DC conversion blocks (960a, 960b, 960s) is connected to a single AC/DC conversion block (950), become a second block. A capacity can be easily increased by stacking as many as desired individual modules from a first conversion block (940a) to an nth conversion block (940n), as demand for a large capacity of charging increases.

The mesh unit (800) includes at least one of a serial/parallel set-up unit (810), a power side mesh unit (820) and a load side mesh unit (830), and
connects the DC/DC conversion blocks (960a, 960b, 960s) in tree structure. In a case the tree connection structure of the mesh unit (800) is changed, a power value or an output voltage applied to each connector (20a, 20b, 20c, 20r) is adjusted.

The serial/parallel set-up unit (810) interconnects the plurality of DC/DC conversion blocks (960a, 960b, 960s) in series or in parallel. The power side mesh unit (820) changes the tree connection structure of the plurality of DC/DC conversion blocks (960a, 960b, 960s) to a variable structure, and the load side mesh unit (830) changes the tree connection structure of the power side mesh unit (820) and each connector (20a, 20b, 20c, 20r) to a variable structure.

A power value outputted from any one connector from the first connector (20a) to the rth connector (20r) is adjusted from the reference power value outputted from the DC/DC conversion blocks (960a, 960b, 960s) to zero. A power value outputted from any one connector from the first connector (20a) to the rth connector (20r) is adjusted from zero to a reference power value, using a value in which the reference power value is divided by r*q as a minimum unit, based on ON/OFF of each relay.

As apparent from the foregoing, the universal charging device according to the present disclosure has an industrial applicability in that expansion and change of output power value can be easily accomplished through a multi-tier block structure of charging unit, a charging pack and a charging module, whereby volumization of the universal charging device and a charging speed control can be promptly addressed by the multi-tier structure of the charging unit, an electric vehicle can be intellectually charged using an optimum power value, voltage and current adequate to a user command received through data readable from a BMS from the electric vehicle or a kiosk because mutually different power values, mutually different voltages and mutually different currents can be transmitted for each connector, a charging unit can be separately installed from a kiosk to obtain an installation flexibility of a charging system, and a power value, a voltage and a current can be easily changed for each connector because each of the charging packs and connectors can be variably configured in a mesh structure using various connection means that connect each charging pack and the connector.

The universal charging device according to the present disclosure has another industrial applicability in that the installation number of voluminous AC/DC conversion blocks having a large heating value and consuming lots of installation costs can be minimized, such that the one voluminous AC/DC conversion block can be replaced with a plurality of DC/DC conversion blocks with a smaller size, a less heating value and a less installation cost, where obtainment of variation in output power value and charging capacity can be realized by a variable tree structure of a mesh unit, whereby reduction in installation costs and convenience in maintenance can be accomplished to implement a charging speed control in real time using variation of the power value.

Although embodiments have been described with reference to a number of illustrative embodiments thereof, it should be understood that numerous other modifications and embodiments can be devised by those skilled in the art that will fall within the spirit and scope of the principles of this invention. More particularly, various variations and modifications are possible in the component parts and/or arrangements of the subject combination arrangement within the scope of the disclosure, the drawing and the appended claims. In addition to variations and modifications in the component parts and/or arrangements, alternative uses will also be apparent to those skilled in the art.

What is claimed is:
1. A universal charging device, the device comprising:
a plurality of charging packs each of which comprises an AC terminal for inputting an alternating current (AC) power, an AC/DC converter for rectifying the AC power to a direct current (DC) power, and a DC terminal for outputting the DC power of a first power value; and a charging module in which the plurality of charging packs are connected attachably and detachably in parallel or serial manners, the charging module comprising an AC input portion for commonly inputting the AC power to the AC terminal, a DC output portion for connecting the DC terminal in parallel or serial manners, and a charging module controller that controls an array of the plurality of charging packs, wherein the DC output portion supplies the DC power to a connector of a kiosk, a value of the DC power is dependent on a number of the plurality of charging packs or a control status of the charging module controller, and the DC power is supplied to the connector without being battery charged, and wherein the plurality of charging packs or the charging module are separately provided from the kiosk and installed at a position different from a position of the kiosk wherein: the charging module is disposed in a charging unit, the charging unit comprising an AC bus bar commonly connected to the AC input portion or a DC bus bar connected in parallel or serial manners to the DC output portion, and a plurality of charging modules including the charging module are connected attachably and detachably in parallel or serial manners; and the DC bus bar outputs DC power that has a value that is variable in proportion to a number of the plurality of charging modules disposed in the charging unit.

2. The universal charging device of claim 1, wherein the universal charging device varies an output voltage or an output current of the DC terminal outputting a first power value, and varies an output voltage or an output current of the DC bus bar or the DC output portion which outputs positive integer times of the first power value, and wherein the universal charging device applies, to the connector, a power value, an output voltage, and an output current different from a power value, an output voltage, and an output current that the universal charging device applies to another connector of the kiosk.

3. A universal charging device of claim 1, wherein the DC bus bar is provided in several strands including a first DC bus bar and a second DC bus bar, and wherein lower DC power than that of the first DC bus bar is supplied to the second connector connected to the second DC bus bar compared with the first connector connected to the first DC bus bar, and wherein the first connector is for use in quick charging and the second connector is for use in slow speed charging.

4. The universal charging device of claim 1, further comprising:

a power transmission unit that transmits the DC power generated by the charging unit to the kiosk; and a main controller that data-communicates with the charging module controller to individually control the charging module controller for each charging module, wherein the main controller data-communicates with a battery management system (BMS), the power transmission unit and the charging unit, and wherein the main controller recognizes at least one of a charged status of a electric vehicle grasped through the BMS, a temperature and an operation status of the plurality of charging pack grasped through a driving chip disposed in the plurality of charging packs, a temperature and an operation status of the plurality of charging packs or the charging module grasped through the charging module controller and a user command inputted to the kiosk, and wherein the main controller automatically determines at least one of a power value of DC power of the connector, an output voltage, an optimum value of an output current of the DC terminal.

5. A universal charging device, the device comprising:

a first charging pack to an nth charging pack each of which rectifies an alternating current (AC) power to a direct current (DC) power and generates a DC power of a first power value;

a first charging module to a kth charging module each of which comprises the first charging pack to the nth charging pack connected attachably and detachably in parallel or serial manners;

a charging unit comprising the first charging module to the kth charging module connected attachably and detachably in parallel or serial manners;

a kiosk connected to a plurality of connectors, the plurality of connectors receiving the DC power from the charging unit, and the DC power is supplied from the charging unit to the connector without being battery charged; and a main controller that supplies, to the plurality of connectors, the DC power that has a value that varies from the first power value to positive integer times of the first power value based on a number of charging packs n disposed in the charging module or operation status of at least one of the first charging pack to the nth charging pack, the first charging module to the kth charging module, the charging unit, the kiosk and a battery management system (BMS) of an electric vehicle to be connected to one of the plurality of the connectors, wherein at least one of the first charging pack, the first charging module and the charging unit is separately provided from the kiosk and installed at a position different from a position of the kiosk, wherein:

the first charging pack comprises an AC terminal that inputs the AC power, an AC/DC converter that rectifies the AC power to the DC power, a DC terminal that outputs the DC power of the first power value, and a charging pack switch that turns on or off an output of the DC power;

the first charging module comprises at least one of an AC input portion for commonly inputting the AC power to the AC terminal, a DC output portion for connecting the DC terminal in parallel, and a charging module controller that individually controls the first charging pack to the kth charging pack to turn on or off the first charging pack to the kth charging pack;

the charging unit comprises an AC bus bar commonly connected to the AC input portion and a DC bus bar commonly connecting the DC output portion in parallel or serial manners; and wherein the AC power is distributed to each charging module through the AC input portion after being inputted to the charging unit through the AC bus bar, and is commonly inputted to each charging pack through the AC terminal, and the DC power outputted as the first power value through the DC terminal is changed in its power value through the DC output portion or the DC bus bar.

6. The universal charging device of claim 5, wherein the first power value of the DC power outputted from the DC output portion is changed based on whether a particular charging pack by selecting the particular charging pack among the first charging pack to the nth charging pack is turned on by the main controller, and wherein the first power value of the DC power outputted from the DC bus bar is changed based on whether a particular charging module by selecting the particular charging module among the first charging module to the kth charging module is connected to the DC bus bar by the main controller.

7. The universal charging device of claim 5, wherein a DC switch unit selects at least part of the DC terminal and connects in a plurality of combinations or a variable relay unit selects at least some of the DC bus bars and connects the selected DC bus bars in parallel or serial manners in a plurality of combinations, and wherein the main controller controls at least one operation of the DC switch unit or the variable relay unit to selectively connect in parallel or serial manners a particular charging pack among from the first charging pack to the nth charging pack, or to selectively connect a particular charging module among the charging modules from the first charging module to the kth charging module.

* * * * *